(12) United States Patent
Kakiuchi

(10) Patent No.: US 6,940,964 B2
(45) Date of Patent: Sep. 6, 2005

(54) PUSH-BUTTON SIGNAL RECEIVING CIRCUIT AND A METHOD OF DETECTING A PUSH-BUTTON SIGNAL

(75) Inventor: Takashi Kakiuchi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 595 days.

(21) Appl. No.: 10/084,152

(22) Filed: Feb. 28, 2002

(65) Prior Publication Data

US 2003/0016058 A1 Jan. 23, 2003

(30) Foreign Application Priority Data

Jul. 3, 2001 (JP) ........................................ 2001-202547

(51) Int. Cl.[7] .................................................. H04Q 1/45

(52) U.S. Cl. ...................................... 379/286; 379/283

(58) Field of Search ................................ 379/386, 352, 379/283

(56) References Cited

U.S. PATENT DOCUMENTS 4,042,789 A * 8/1977 Richards ...................... 379/386
5,528,663 A * 6/1996 Locke et al. ................. 379/386

* cited by examiner

Primary Examiner—Sinh Tran
Assistant Examiner—Daniel Swerdlow
(74) Attorney, Agent, or Firm—Arent Fox PLLC

(57) ABSTRACT

A push-button signal receiving circuit and a push-button signal detection method are provided which can enhance frequency detection accuracy and yet can reduce erroneous determination as to the valid length of PB signal and thus erroneous operation. Valid signal determining portion determines the validity of a received PB signal in accordance with the results of determination as to the coincidence of continuance times of identification signals extracted by first and second frequency detecting portion for performing frequency detection over a small number of periods, and the coincidence of the frequencies detected by the first and second frequency detecting portion with those detected by third and fourth frequency detecting portion over a large number of periods.

6 Claims, 13 Drawing Sheets

PUSH-BUTTON SIGNAL RECEIVING CIRCUIT AND A METHOD OF DETECTING A PUSH-BUTTON SIGNAL

BACKGROUND OF THE INVENTION

1. Field of the Invention

The present invention relates to a circuit for receiving a push-button signal and identifying a dialed number based on the received signal, and to a method of detecting such a push-button signal.

2. Description of the Related Art

In analog telephone communications, push-button signal (hereinafter abbreviated as PB signal) is used as a selection signal whereby a telephone terminal specifies a target of connection. In such communications using the PB signal, one of low-frequency identification signals with frequencies of 697 Hz, 770 Hz, 852 Hz and 941 Hz is combined with one of high-frequency identification signals with frequencies of 1209 Hz, 1336 Hz, 1477 Hz and 1633 Hz so that based on a total of 16 different signals, a dialed number can be identified. A low-frequency signal and a high-frequency signal, which are used in combination, are continuously sent out for a fixed time or longer in response to a single dialing operation. Also, between dealing operations, there is provided a time period which is equal to or longer than a second fixed time called minimum cause and in which no signal is present.

A PB signal receiving circuit receives the combination of the low- and high-frequency signals, and judges that the input signal is a valid selection signal if the signal has been continuously received over the first fixed time. Also, if reception of the signal discontinues for the second fixed time or longer, the PB signal receiving circuit regards such a signal discontinuance time as the minimum pause, and judges a signal with the same frequency received thereafter to be a different selection signal.

FIG. 6 exemplifies a schematic configuration of a conventional PB signal receiving circuit generally used.

A PB signal receiving circuit 30 shown in FIG. 6 comprises a filter 31 for removing a dial-tone signal from the input signal, filters 32 and 33 for separating the input signal into low- and high-frequency signals, respectively, frequency detection circuits 34 and 35 for the low- and high-frequency signals, respectively, a signal determination circuit 36 for identifying a dialed number based on the detected frequencies, a control circuit 37 for determining valid length as the identification signal, and an output circuit 38 for outputting number data with a valid length.

The filter 31 removes, from the input signal, the dial-tone signal which is an audible signal with a frequency lower than the low-frequency signals and which prompts the user of a telephone terminal to send a selection signal. The filters 32 and 33 selectively pass only low- and high-frequency bands, respectively, of the signal output from he filter 31. The frequency detection circuits 34 and 35 detect the frequencies of the respective input signals. If both of the frequency detection circuits 34 and 35 detect valid low and high frequencies, respectively, the signal determination circuit 36 recognizes detection of low- and high-frequency identification signals and outputs a detection signal to the control circuit 37. Also, the signal determination circuit identifies a dialed number based on the combination of the identification signals and outputs number data indicative of the identified number to the output circuit 38. The control circuit 37 monitors the continuance time and discontinuance time of the input detection signal to determine valid length as the identification signal, and outputs a validity signal EN indicating the length. The output circuit 38 outputs number data having a length based on the validity signal EN from the control circuit 37, as 4-bit data D31, D32, D33 and D34, for example.

Referring now to FIG. 7 which is a timing chart showing signals appearing in various parts of the above PB signal receiving circuit 3C, the operation of the receiving circuit 30 will be described.

A input signal S41 input to the PB signal receiving circuit 30 includes the dial tone, low-frequency signal, high-frequency signal, etc. The filter 31 outputs a signal S42 from which the dial tone has been removed, and the filters 32 and 33 output signals S43 and S44 containing only components of the low- and high-frequency ranges, respectively. The frequency detection circuits 34 and 35 output identification signals S45 and S46, which correspond to their respective assigned low and high frequencies, to the signal determination circuit 36. The signal determination circuit 36 outputs a detection signal S47 corresponding to the PB signal, which is derived as a logical product of the identification signals S45 and S46, to the control circuit 37.

The control circuit 37 monitors the continuance time and discontinuance time of the input of the detection signal S47, and outputs the validity signal EN indicating a valid length as the selection signal. Specifically, the control circuit 37 starts to count the input continuance time at timing T21 at which The detection signal S47 turns to the H level, for example. If the detection signal S47 remains at the H level up to timing T22 over a preset continuance criterion time Ton, the control circuit judges that the detection signal S47 is a valid selection signal, and turns the validity signal EN to the H level. At timing T23 at which the detection signal S47 turns to the L level, the control circuit starts to count the input discontinuance time. However, since the detection signal S47 again turns to the H level at timing T24 before a preset discontinuance criterion time Toff elapses, the control circuit does not judge that the selection signal has discontinued, and holds the validity signal EN at the H level. The control circuit again starts to count the discontinuance time at timing T25 at which the detection signal S47 turns to the L Level, and at timing T26 after a lapse of the discontinuance criterion time Toff for which the detection signal remained at the L level, the control circuit judges that the selection signal has discontinued, and turns the validity signal EN to the L level. The output circuit 38 outputs the number data D31 to D34 having a valid data length based on the rise and fall timings of the validity signal EN.

FIG. 8 shows frequency detection characteristics of the PB signal receiving circuit 30.

As shown in FIG. 8, in the PB signal receiving circuit 30, allowable frequencies fah and fal are set respectively as upper and lower limits of frequency for allowing signal reception, with respect to a nominal frequency fo of each identification signal, and a signal with a frequency falling within the range between the allowable frequencies fah and fal is received without fail. Also, forbidden frequencies fph and fpl are set so as to be separated from the allowable frequency range, and a signal with a frequency higher than the forbidden frequency fph and a signal with a frequency lower than the forbidden frequency fpl are not accepted. A region between the allowable frequency fah and the forbidden frequency fph and a region between the allowable frequency fal and the forbidden frequency fpl each constitute an uncertainty region in which whether signal is received or not is uncertain. In order to prevent erroneous operation, therefore, the range between the allowable frequencies fah and fal should desirably be narrowed, and also the values of the forbidden frequencies fph and fpl should desirably be as close to the respective allowable frequencies fah and fal as possible.

Provided a frequency deviation in which reception is allowed is da and a frequency deviation in which reception is forbidden is dp (da<dp), the nominal frequency fo, the allowable frequencies fah and fal, and the forbidden frequencies fph and fpl are in the relationships indicated by the following equations (1), (2), (3) and (4):

$$fah=(1+da)\times fo \quad (1)$$

$$fal=(1-da)\times fo \quad (2)$$

$$fph=(1+dp)\times fo \quad (3)$$

$$fpl=(1-dp)\times fo \quad (4)$$

Meanwhile, a method of detecting frequency in the frequency detection circuits 34 and 35 includes a method of extracting a signal with a specified frequency by using a filter and a method of measuring period. Of these methods, the period measuring method is more often used because of simplicity of circuit configuration and hence higher economical efficiency.

To measure the period, an interval between time points at which the input signal level crosses a certain threshold is measured, for example. In cases where the input signal includes noise whose frequency falls within the passband of the filter 32 or 33, however, such noise can vary the threshold crossing timing, thus causing jitter. FIG. 9 illustrates noise-induced period variations during the period measurement.

In FIG. 9, the threshold for frequency detection is set at 0 V. Also, in the figure, a signal S51 shows an example of input signal waveform including no noise, and signals S52 and S53 individually show the input signal on which noise is superimposed in a range such that the threshold crossing timing is varied by +Δt at the maximum. Provided the peak level of the signal S51 is S, the noise level with respect to the signal S51 is N, and the period of the signal S51 is T, then $$\sin(2\pi\times(\Delta t/T))=N/S \quad (5)$$

$$\Delta t=T\times\sin^{-1}(N/S)/2\pi \quad (6)$$

As seen from equation (6) above, the variation Δt in the threshold crossing point is dependent on the ratio of the noise level N to peak level S of the signal S51. Also, because of inclusion of noise, a detected period varies in the range from a minimum value Tmin (=T−2Δt) to a maximum value Tmax (=T+2Δt), as shown in FIG. 9. Jitter J caused in this case is indicated by equation (7) below.

$$J=2\Delta t/T=\sin^{-1}(N/S)/\pi \quad (7)$$

FIG. 10 is a graph showing the relationship between the amplitude ratio N/S of noise to signal and jitter J, based on equation (7), and FIG. 11 illustrates the influence of jitter upon the frequency detection characteristics.

As shown in FIG. 10, the amount of jitter J increases with increase in the amplitude ratio N/S of noise to signal. Also, as shown in FIG. 11, in the case of allowing the reception of noise in a range in which jitter J is caused, then it is necessary that the absolute value of the allowable frequency deviation for the frequency detection should be da+J, and that the absolute value of the forbidden frequency deviation should be dp−J. Thus, in the case where the frequency range in which noise is admitted at the time of frequency detection is broadened, the forbidden frequency deviation also should be enlarged. This, however, lowers the frequency detection accuracy often causes an error in determining the presence/absence of input signal.

Usually, ambient noise picked up by the microphone of a telephone terminal or noise caused by crosstalk of lines, etc. is superimposed on the signal input to the PB signal receiving circuit 30, and it is therefore desirable that the identification signal be detected while allowing inclusion of a certain degree of noise. However, in the conventional P3 signal receiving circuit 30, broadening the range of admitting noise entails an increase in the rate of occurrence of errors, as mentioned above. In order to enhance the accuracy in the frequency detection of the input signal while at the same time allowing inclusion of a certain degree of noise, a method may be adopted in which the frequency (period) detection cycle is set to multiple periods, not one period, of the input signal. If the detection cycle is set to n periods of the input signal, for example, the influence of jitter J on the frequency detection can be reduced to 1/n.

However, where frequency is detected over multiple periods of the input signal, a longer time is required before the detected frequency is established than in the case of the detection over a smaller number of periods, such as one period, so that error in determining the continuance and discontinuance of the input signal expands. FIG. 12 shows examples of frequency detection over multiple periods of the input signal, wherein (A) shows the input signal, (B) shows the frequency determination according to a first example of detection, (C) shows the output of the identification signal according to the first example of detection, (D) shows the frequency determination according to a second example of detection, and (E) shows the output of the identification signal according to the second example of detection.

FIG. 12 illustrates in time sequence how a low-frequency identification signal with a frequency of 697 Hz, for example, is detected, wherein the number n of periods of the input signal corresponding to one detection cycle is 20 (n=20). Thus, one detection cycle in which the detected frequency is established is 28.69 msec. Also, a maximum time for the detection over 20 periods of the input signal is set to 31.56 msec, which is 110% of one detection cycle. If 20 periods of the input signal exceed 31.56 msec, it is judged that the input signal is not valid as the 697-Hz identification signal, and the next period measurement of the input signal is started. Parts (C) and (E) of FIG. 12 illustrate the states of extraction of the identification signal S45 by the frequency detection circuit 34 appearing in FIG. 6.

As shown in (A) of FIG. 12, the input signal is actually input to the frequency detection circuit 34 from timing T32 to timing T40. In the first example of detection shown in (B) of FIG. 12, the period detection is started at timing T33 immediately after timing T32 of the input signal, and the detection time for 20 periods is counted. Then, at timing T35 after a lapse of 28.69 msec from the start of detection, reception of the 697-Hz Identification signal is detected, and the identification signal is extracted as shown in (C) of FIG. 12. The counting of the period detection time is again started thereafter for the next detection.

In the first example of detection, at timing T40 immediately after the detection is newly started at timing T39, the input signal discontinues. In this detection cycle, therefore, the input is judged invalid at timing T42 after a lapse of 31.56 ms, and the output of the identification signal is stopped, as shown in (C) of FIG. 12.

On the other hand, in the second example of detection shown in (D) of FIG. 12, the period detection is newly started at timing T31 and the period detection time is counted. However, since the input of the signal starts at timing T32 immediately after the start of the period detection, 20 periods of the input signal fail to be detected within 31.56 ms. Accordingly, the input signal is judged invalid at timing T34, and the counting of the period detection time is again started. As a result of the subsequent period detection terminating at timing T36, the identification signal is extracted as shown in (E) of FIG. 12.

Also, the detection is newly started at timing T38, and the input signal discontinues at timing T40 immediately before the counting of 20 periods is finished. In this detection cycle, therefore, the input is judged invalid at timing T41 after a lapse of 31.56 ms, and the output of the identification signal is stopped, as shown in (E) of FIG. 12.

As seen from the above, in the case where the detection cycle start timing is immediately after the reception start timing of the input signal, as in the first example of detection, the output start timing of the identification signal is earlier by a maximum of about one detection cycle, that is, about 28.69 msec, than in the case where the detection start timing is immediately before the reception start timing of the input signal, as in the second example of detection. Also, where the reception of the input signal ends immediately after the completion of counting for 20 periods, as in the first example of detection, the output stop timing of the identification signal is later by a maximum of about one detection cycle than in the case where the reception of the input signal ends immediately before the completion of counting for 20 periods, as in the second example of detection. Accordingly, the output timing of the identification signal is subject to an error of about two detection cycles at the maximum. Thus, in the case of the period detection over multiple periods of the input signal, the error in the output timing of the identification signal expands because of long detection cycle.

FIG. 13 illustrates exemplary cases where a short break occurs during the frequency detection over multiple periods of the input signal, wherein (A) shows the input signal, (B) shows the frequency determination according to a first example of detection, (C) shows the output of the identification signal according to the first example of detection, (D) shows the frequency determination according to a second example of detection, and (E) shows the output of the identification signal according to the second example of detection.

In FIG. 13, the identification signal with a frequency of 697 Hz is detected, n is set to 20 (n=20), so that one detection cycle is 28.69 msec, and a maximum allowable time for the detection of 20 periods is set to 31.56 msec, which is 110% of one detection cycle, as in FIG. 12.

As shown in (A) of FIG. 13, the signal actually input to the frequency detection circuit 34 undergoes a short break from timing T53 to timing T55. In the first example of detection shown in (B) of FIG. 13, the detection cycle starts anew at timing T52, and after the counting of signal continuance time is started, the input signal discontinues from timing T53 to timing T55. Since the period detection of the input signal is delayed because of the discontinuance time, 20 periods of the input signal fail to be detected within 31.56 ms; accordingly, the input signal is judged invalid at timing T56 and the output of the identification signal is stopped, as shown in (C) of FIG. 13. Subsequently, the counting of the period detection time is again started, and the output of the identification signal is started again at timing T58 as a result of the frequency detection.

On the other hand, in the second example of detection shown in (D) of FIG. 13, the period detection is newly started at timing T51, and the input signal discontinues at timing T53 before the input signal is received over 20 periods. At timing T54 within the discontinuance time, the maximum time 31.56 ms as counted from the start of the period detection elapses, so that the input is judged invalid, and the output of the identification signal is stopped, as shown in (E) of FIG. 13. Further, while the input signal is discontinued, the period detection is again started; therefore, also in the subsequent detection cycle, 20 periods of the input signal fail to be detected within 31.56 ms. Thus, the input signal is again judged invalid at timing T57, so that no identification signal is output. Subsequently, the frequency detection is newly started, and the output of the identification signal s started again at timing T59.

As seen from the above, in the case where the input signal is judged invalid at timing during the short break of the input signal, as in the second example of detection, the output stop time of the identification signal is prolonged for a maximum of about one detection cycle, compared with the first example of detection wherein the signal determination does not take place during the short break. Consequently, error in the output stop time of the identification signal expands with increase in the detection cycle.

As shown in the examples of FIGS. 12 and 13, in the case of detecting the period of the input signal, error in the extraction of the identification signal occurs depending on the relationships between the reception start and stop timings of the input signal and the start and end timings of the period detection, and this error becomes more and more noticeable as the detection cycle is prolonged. In the DB signal receiving circuit 30, the control circuit 37 detects the signal continuance time based on the extraction timing of the identification signal, to determine a valid length as the selection signal. With the method in which the period detection is performed over numerous periods of the input signal, therefore, error in the detection of the signal continuance time expands because of large error in the extraction timing of the identification signal, giving rise to a problem that erroneous operation occurs in relation to the output of number data.

Also, the input to the PB signal receiving circuit 30 very often includes, besides the original PB signal, ambient noise or voice picked up by the microphone of a telephone terminal as well as noise caused by crosstalk of lines, etc., as mentioned above, and such noises must not be detected as the identification signal. However, with the method in which the period detection is performed over numerous periods of the input signal, the input signal is judged to be an identification signal insofar as a predetermined number of periods of the input signal is detected within a prescribed detection time, even if the input frequency greatly varies during the detection cycle, so that erroneous detection of the identification signal is liable to occur.

On the other hand, in the case of the method wherein the period detection is performed over a fewer periods of the input signal, if the frequency range is broadened to admit noise at the time of frequency detection, then the forbidden frequency deviation needs to be enlarged, as mentioned above. This, however, lowers the frequency detection accuracy and also often causes erroneous operation in relation to the determination of the presence/absence of input signal.

SUMMARY OF THE INVENTION

The present invention was created in view of the above circumstances, and an object thereof is to provide a PB signal receiving circuit which has enhanced frequency detection accuracy and yet is reduced in erroneous determination as to the valid length of PB signal and thus in erroneous operation.

To achieve the above object, there is provided a push-button signal receiving circuit for receiving a push-button signal and identifying a dialed number based on the received push-button signal. The push-button signal receiving circuit comprises first and second frequency detecting portion provided respectively for low- and high-frequency identification signals included in the received push-button signal, for detecting frequencies of input signals over one or more periods thereof to extract the identification signals, third and fourth frequency detecting portion provided respectively for the low- and high-frequency identification signals included in the received push-button signal, for detecting the frequencies of the input signals over a number of periods greater than that of the first and second frequency detecting portion, to extract the identification signals, valid signal determining portion for determining whether the received push-button signal is valid or not based on results of determination as to coincidence of continuance times of the identification signals extracted by the first and second frequency detecting portion, coincidence of the frequencies detected by the first and third frequency detecting portion, and coincidence of the frequencies detected by the second and fourth frequency detecting portion, and dialed number output portion for outputting the dialed number based on the detected low and high frequencies if the push-button signal is judged valid by the valid signal determining portion.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 is a chart showing output signals of various parts of the frequency detection circuit, wherein FIG. 4(A) shows how a signal with an arbitrary frequency is detected, and FIG. 4(B) shows how a 697-Hz signal is detected;

DESCRIPTION OF THE PREFERRED EMBODIMENTS

Embodiments of the present invention will be hereinafter described with reference to the drawings.

Figure 1:
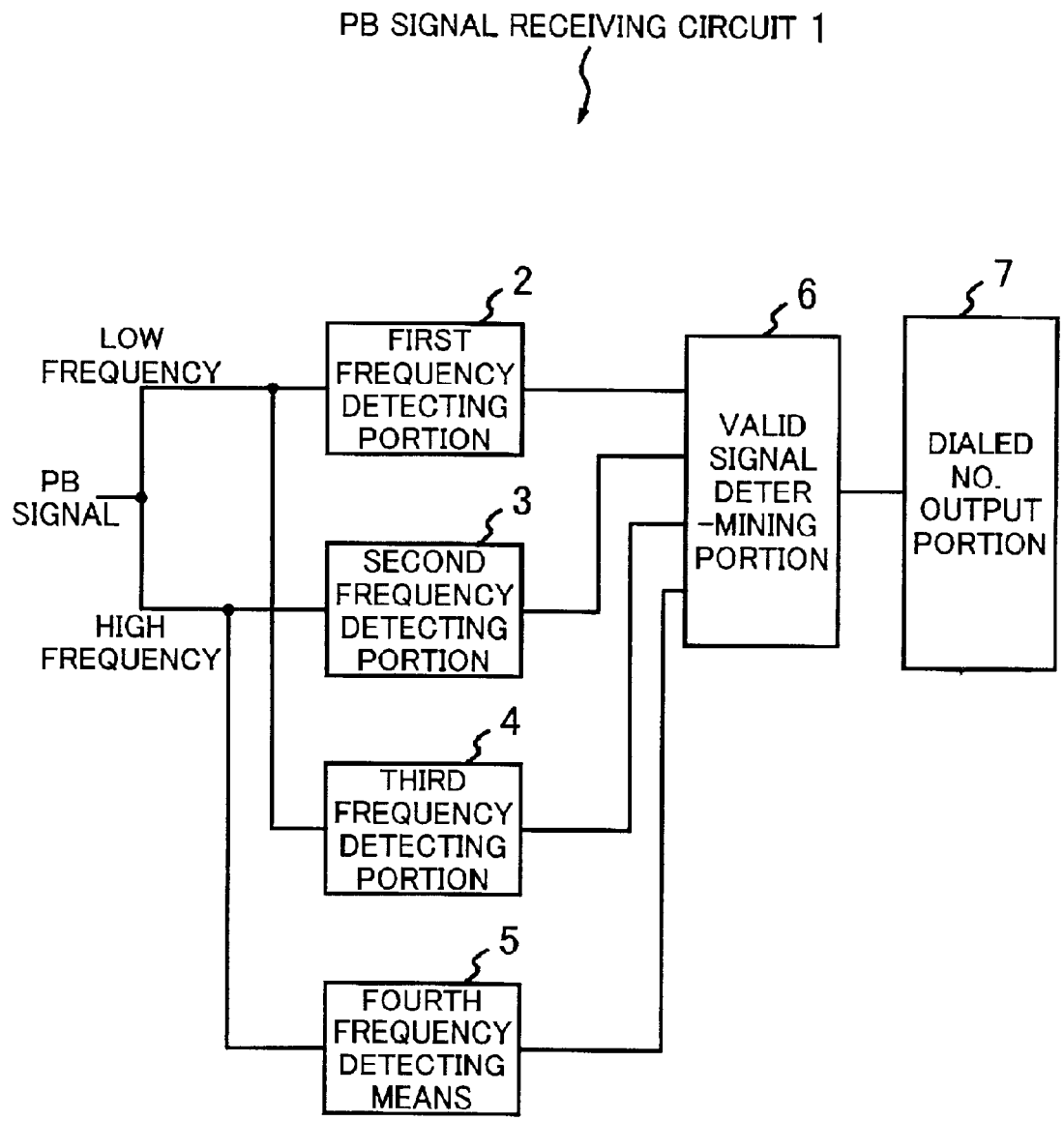
FIG. 1 is a diagram illustrating the principle of a PB signal receiving circuit according to the present invention.

FIG. 1 illustrates the principle of a push-button signal (hereinafter abbreviated as PB signal) receiving circuit according to the present invention.

As shown in FIG. 1, a PB signal receiving circuit according to the present invention comprises first and second frequency detecting portion 2 and 3 provided respectively for low- and high-frequency identification signals included in a received PB signal, for detecting frequencies of the identification signals over one or more periods thereof, third and fourth frequency detecting portion 4 and 5 for detecting the frequencies of the respective identification signals over a number of periods greater than that of the first and second frequency detecting portion, valid signal determining portion 6 for determining whether the received PB signal is valid or not, and dialed number output portion 7 for outputting a dialed number specified by the PB signal, in accordance with the result of determination by the valid signal determining portion 6.

The first and second frequency detecting portion 2 and 3 perform frequency detection over a relatively small number of periods, for example, one period, of the respective identification signals, to extract the low- and high-frequency identification signals, respectively. The third and fourth frequency detecting portion 4 and 5 carry out frequency detection over a relatively large number of periods of the respective identification signals, to extract the low- and high-frequency identification signals, respectively. Also, the first and second frequency detecting portion 2 and 3, for example, admit a wider range of noise included in the input signal than the third and fourth frequency detecting portion 4 and 5.

Each frequency detecting portion detects, for example, the period of the input signal to detect its frequency. As a period detection method, a method may be employed wherein, for example, a time required until the number of times the input signal level crosses a certain threshold reaches a predetermined number is measured, and it is determined whether or not the measured time falls within an allowable time range preset for each frequency, to extract the identification signal with a desired frequency. In this case, the first and second frequency detecting portion 2 and 3, for example, have a wider allowable time range set per period of the respective identification signals than the third and fourth frequency detecting portion 4 and 5, thus setting different allowable ranges for noise included in the input signal.

The valid signal determining portion 6 determines whether the received PB signal is valid or not based on the results of determination as to the coincidence of continuance times of the identification signals extracted by the first and second frequency detecting portion 2 and 3, the coincidence of frequencies detected by the first and third frequency detecting portion 2 and 4, and the coincidence of frequencies detected by the second and fourth frequency detecting portion 3 and 5.

Specifically, the continuance times of the identification signals extracted by the first and second frequency detecting portion 2 and 3, for example, are measured. If the frequencies detected by the first and third frequency detecting portion 2 and 4 coincide with each other and also if the frequencies detected by the second and fourth frequency detecting portion 3 and 5 coincide with each other when the continuance times reach a fixed time, it is judged that the PB signal being received is valid. Also, if any of the extracted identification signals does not continue for the fixed time but discontinues in the middle, the identification signal is judged invalid. In the case where the extraction of the identification signal discontinues for a certain time after the signal is judged valid, it is concluded that the valid length of the PB signal has terminated.

When the PB signal is judged valid by the valid signal determining portion 6, the dialed number output portion 7 identifies a specified dialed number based on the detected low and high frequencies, and outputs the dialed number. The output of the dialed number is started at timing at which the PB signal being received is judged valid by the valid signal determining portion 6.

The first and second frequency detecting portion 2 and 3 detect frequencies over a relatively small number of periods, and thus error in the extraction start and stop timings of the identification signals is small. Using the identification signals extracted by the first and second frequency detecting portion 2 and 3, which perform frequency detection over a relatively small number of periods as mentioned above, the valid signal determining portion 6 measures the continuance time and discontinuance time of the signals to determine the validity of the signals, whereby the timing for determining validness can be recognized with higher accuracy.

In cases were the frequency detection is performed over a relatively small number of periods n this manner, the frequency detection accuracy lowers. Accordingly, using the third and fourth frequency detecting portion 4 and 5 for performing the frequency detection over a larger number of periods, frequencies are detected in parallel, and only when the detected frequencies coincide, the PB signal is judged valid. This prevents erroneous operation from being caused either by error in the detection of the frequencies of the identification signals or by error in the recognition of the extraction start time, while allowing inclusion of a certain degree of noise.

Figure 2:
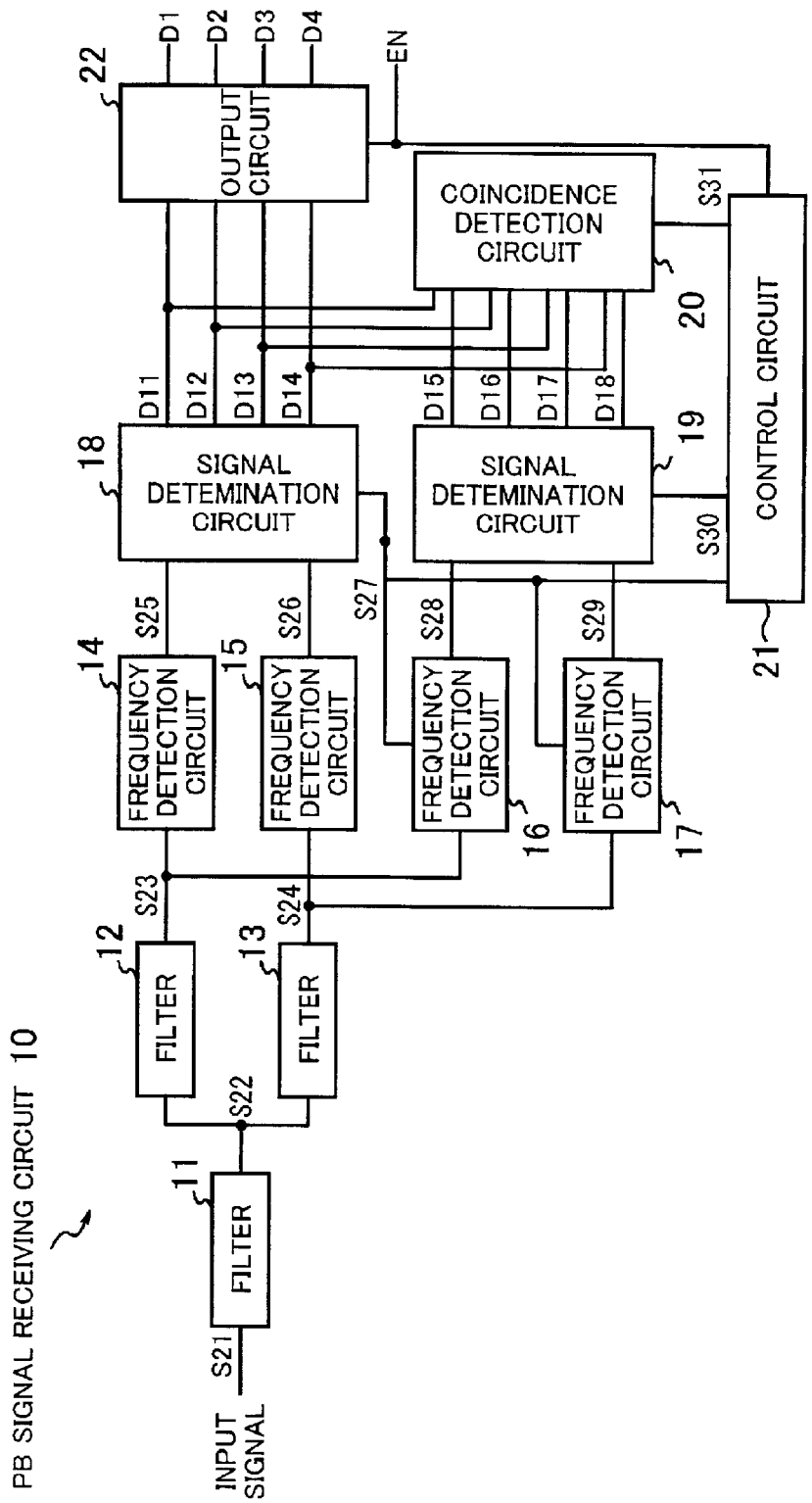
FIG. 2 is a diagram schematically showing an exemplary configuration of the PB signal receiving circuit according to the present invention.

An embodiment of the present invention will be now described. FIG. 2 schematically illustrates an exemplary configuration of a PB signal receiving circuit according to the present invention.

The PB signal receiving circuit 10 shown in FIG. 2 comprises a filter 11 for removing a dial-tone signal from an input signal, filters 12 and 13 for separating the input signal into low- and high-frequency signals, respectively, frequency detection circuits 14 and 15 for detecting frequencies of the low- and high-frequency signals, respectively, over a small number of periods thereof, frequency detection circuits 16 and 17 for detecting the frequencies of the low- and high-frequency signals, respectively, over a large number of periods thereof, signal determination circuits 18 and 19 each for identifying a dialed number based on the frequencies detected by the frequency detection circuits 14, 15 and 16, 17, a coincidence detection circuit 20 for determining whether or not the dialed numbers identified by the signal determination circuits 18 and 19 coincide with each other, a control circuit 21 for determining a valid length as a selection signal, and an output circuit 22 for outputting number data having a valid length.

The filter 11 removes, from the input signal, the dial-tone signal which is an audible signal with a frequency lower than the low-frequency signals. The filters 12 and 13 selectively pass low- and high-frequency bands, respectively, of the signal output from the filter 11.

The frequency detection circuits 14 and 15 detect the frequencies of the output signals from the filters 12 and 13, respectively, over a small number of periods, for example, one period, and extract low- and high-frequency identification signals, respectively. In parallel with this, the frequency detection circuits 16 and 17 detect the frequencies of the output signals from the filters 12 and 13, respectively, over a larger number of periods, and similarly extract the low- and high-frequency identification signals, respectively. The frequency detection circuits 14 and 15 have frequency detection characteristics thereof set so that a range for admitting noise may be wide as compared with the frequency detection circuits 16 and 17. Also, the frequency detection circuits 16 and 17 do not perform their frequency detection while no detection signal is input from the signal determination circuit 18, described below.

When valid low and high frequencies are both detected by the frequency detection circuits 14 and 15, respectively, the signal determination circuit 18 concludes that the identification signals have been detected, and outputs a detection signal to the control circuit 21 as well as to the frequency detection circuits 16 and 17. Also, the signal determination circuit 18 determines a dialed number based on the combination of the identification signals, and outputs number data indicative of the result of determination to the coincidence detection circuit 20 and the output circuit 22 as 4-bit data D11, D12, D13 and D14, for example. Similarly, when valid low and high frequencies are both detected by the frequency detection circuits 16 and 17, respectively, the signal determination circuit 19 outputs a detection signal indicative of the detect-on of identification signals to the control circuit 21. Also, the signal determination circuit 19 outputs number data indicative of the result of determination to the coincidence detection circuit 20 as 4-bit data D15, D16, D17 and D18, for example.

If the data D11 to D14 from the signal determination circuit 13 coincide respectively with the data D15 to D18 from the signal determination circuit 19, the coincidence detection circuit 20 outputs a coincidence detection signal, which indicates coincidence of the dialed numbers determined through the frequency detections over different detection cycles, to the control circuit 21.

The control circuit 21, which is supplied with the detection signals relating to the respective frequency detections as well as the coincidence detection signal, monitors the continuance time and discontinuance time of the detection signal from the signal determination circuit 18 to determine a valid length as the identification signal, and outputs a validity signal EN indicative of the length. The output of the validity signal EN is started if the input of the detection signal from the signal determination circuit 18 has continued for a fixed time and also if the control circuit is being supplied with the coincidence detection signal, and is stopped if the input of the detection signal has discontinued for a second fixed time, as described later. The output circuit 22 outputs number data having a length based on the validity signal EN from the control circuit 21, as 4-bit data D1, D2, D3 and D4, for example.

In the PB signal receiving circuit 10 described above, the frequency detection circuits 14 and 15 perform frequency detection over a small number of periods while admitting a wider range of noise, so that the extraction start and stop timings for the identification signal can be detected with accuracy. Also, the frequency detection circuits 16 and 17 carry out frequency detection over a large number of periods while admitting a narrower range of noise, so that the frequency detection can be performed with accuracy.

Figure 3:
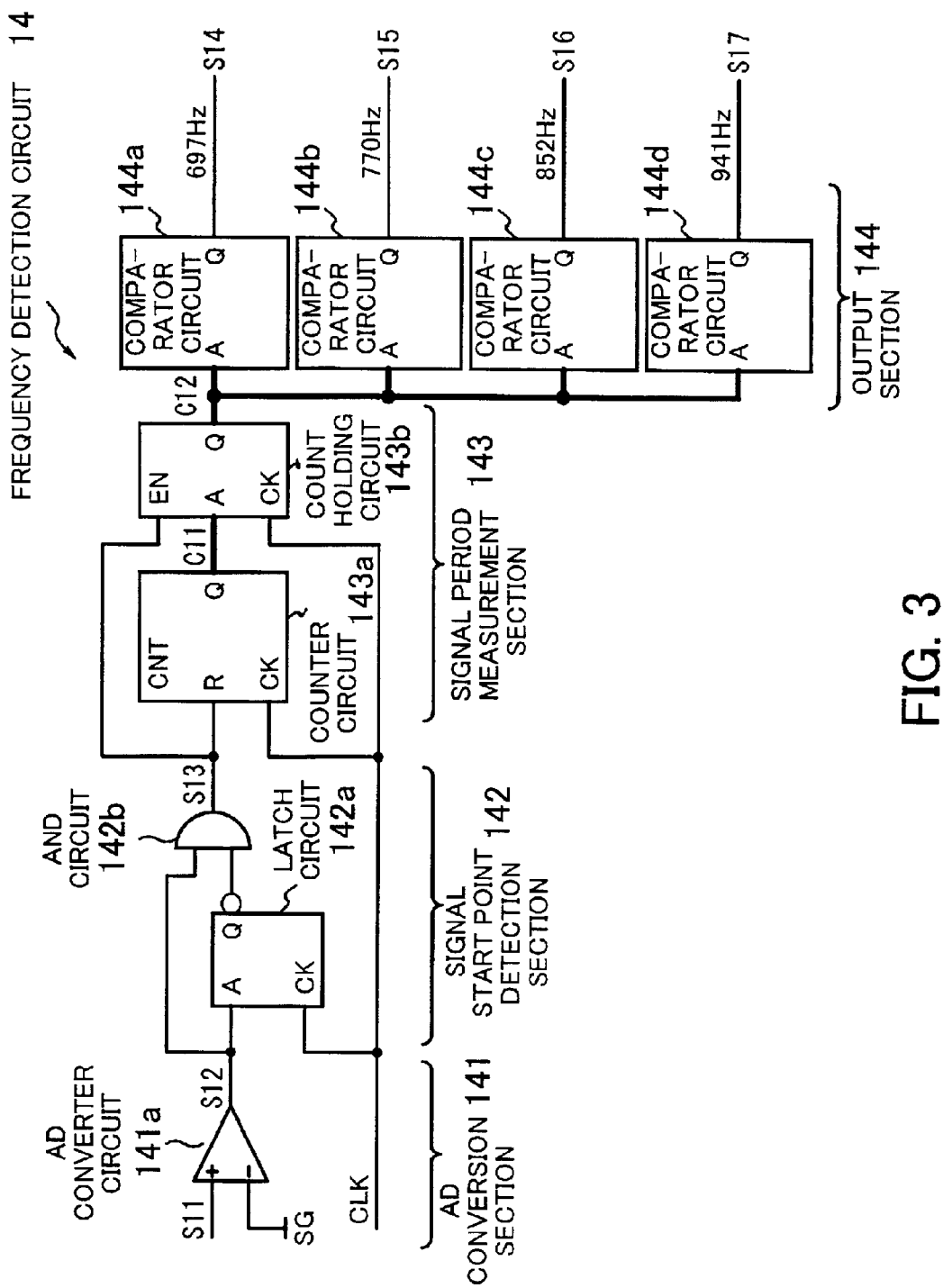
FIG. 3 is a diagram showing an example of circuit configuration of a frequency detection circuit.

FIG. 3 shows an exemplary circuit configuration of the frequency detection circuit 14.

count C11 of the counter circuit 143a at the rise timing of the succeeding pulse of the clock signal CLK, and outputs the held value as a count C12. Thus, the count C12 counted at regular intervals is output from the signal period measurement section 143 for a time period from the period start point to succeeding period start point of the input signal S11.

In the output section 144, the comparator circuits 44a to 144d, which are associated respectively with low frequencies of 697 Hz, 770 Hz, 852 Hz and 941 Hz, determine whether or not the input count C12 is between respective upper- and lower-limit values for determining the respective frequencies, and output frequency determination signals S14, S15, S16 and S17, respectively, to the signal determination circuit 18.

Table 1 below shows, by way of example, allowable frequencies, forbidden frequencies and criterion frequencies for the respective low- and high-frequency signals.

TABLE 1

| Nominal value fo | Forbidden frequency (upper limit) fpl | Allowable frequency (lower limit) fal | Allowable frequency (upper limit) fah | Forbidden frequency (lower limit) fph | Criterion frequency (lower limit) fjl | Criterion frequency (upper limit) fjh | Criterion count (lower limit) nfjl | Criterion count (upper limit) nfjh |
|---|---|---|---|---|---|---|---|---|
| 697 | 672.6 | 686.5 | 707.5 | 721.4 | 679.6 | 714.4 | 1400 | 1472 |
| 770 | 743.1 | 758.5 | 781.6 | 797.0 | 750.8 | 789.3 | 1267 | 1332 |
| 852 | 822.2 | 839.2 | 864.8 | 881.8 | 830.7 | 873.3 | 1145 | 1204 |
| 941 | 908.1 | 926.9 | 955.1 | 973.9 | 917.5 | 964.5 | 1037 | 1090 |
| 1209 | 1166.7 | 1190.9 | 1227.1 | 1251.3 | 1178.8 | 1239.2 | 807 | 848 |
| 1336 | 1289.2 | 1316.0 | 1356.0 | 1382.8 | 1302.6 | 1369.4 | 730 | 768 |
| 1477 | 1425.3 | 1454.8 | 1499.2 | 1528.7 | 1440.1 | 1513.9 | 661 | 694 |
| 1633 | 1575.8 | 1608.5 | 1657.5 | 1690.2 | 1592.2 | 1673.8 | 597 | 628 |

The frequency detection circuit 14 shown in FIG. 3 comprises an AD conversion section 141 including an AD converter circuit 141a, a signal start point detection section 142 including a latch circuit 142a and an AND circuit 142b, a signal period measurement section 143 including a counter circuit 143a and a count holding circuit 43b, and an output section 144 including comparator circuits 144a, 144b, 144c and 144d.

Figure 4:
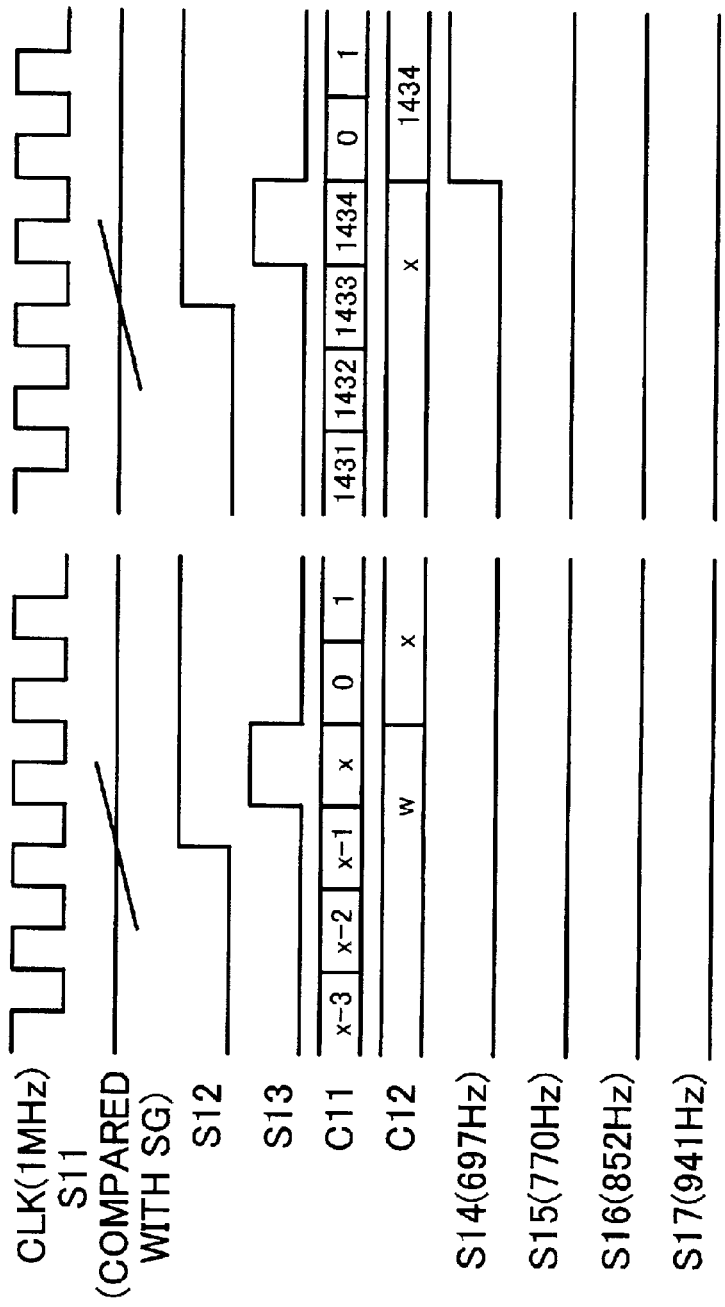

FIG. 4 shows output signals of various parts of the frequency detection circuit 14, wherein FIG. 4(A) shows how a signal with an arbitrary frequency is detected, and FIG. 4(B) shows how a 697-Hz signal is detected. In the following, operation of the frequency detection circuit 14 will be described first with reference to FIGS. 3 and 4(A).

The AD converter circuit 141a is supplied with an input signal S11 from the filter 12 and a reference signal SG and, in accordance with the signal level of the input signal S11 relative to the reference signal SG, outputs a signal S12 which is a binary signal derived frog the input signal S11, as shown in FIG. 4(A). The signal start point detection section 142 latches, by portion of the latch circuit 142a and the AND circuit 142b, the input signal S12 synchronously with the rise of a clock signal CLK, and outputs a signal S13 which is a pulse wave with a duration corresponding to one period of the clock signal CLK, as shown in FIG. 4(A), thereby detecting a period start point of the input signal S11.

In the signal period measurement section 143, the counter circuit 143a keeps counting up the clock signal CLK until it is supplied with the signal S13. At the rise timing of the clock signal CLK following the input of the signal S13, a count C11 is reset, as shown in FIG. 4 (A). Also, upon input of the signal S13, the count holding circuit 143b holds the In Table 1, allowable frequencies fah and fal in each row respectively represent upper- and lower-limit values of frequency for allowing reception, set with respect to a corresponding nominal frequency fo. Also, forbidden frequencies fph and fpl respectively denote lower- and upper-limit values defining ranges in which reception is prohibited. The forbidden frequencies fph and fpl are defined as +3.5% and −3.5%, respectively, of the nominal value fo, and the allowable frequencies fah and fal are usually set at +1.5% and −1.5%, respectively, of the nominal value fo. Criterion frequencies fjh and fjl respectively exemplify upper- and lower-limit values for signal with a frequency to be identified by the corresponding frequency detection circuit 14–17, and in the illustrated example, are set to +2.5% and −2.5%, respectively, of the nominal value fo. Criterion counts nfjh and nfjl exemplify count values corresponding respectively to the criterion frequencies fjh and fjl in the case where the clock frequency is 1 MHz.

Specifically, where the values shown in Table 1 are employed, the frequency detection circuit 14 operates in the manner described below, for example. If the count C11 of the counter circuit 143a is "1434" when the signal S13 is output, as shown in FIG. 4(B), data indicating "1434" is output as the count C12 from the count holding circuit 143b at the rise timing of the succeeding pulse of the clock signal CLK. Since this value falls within the range between the criterion counts nfjh and nfjl for the frequency 697 Hz, the comparator circuit 144a outputs the signal S14. Consequently, the signal determination circuit 18 recognizes that the 697-Hz identification signal has been extracted.

In the above example of frequency detection, period is measured over one period of the input signal S11 for frequency detection. In cases where period is to be measured over multiple periods, a counter is interposed between the signal start point detection section 142 and the signal period measurement section 143, for example, to count the number of outputs of the signal S13, and when the count has reached a predetermined number, a pulse signal with a duration corresponding to one period of the clock signal CLK is output from the counter. Also, in each of the comparator circuits 144a to 144d are set criterion counts nfjh and nfjl corresponding to the number of periods to be measured.

In this case, therefore, the upper limit for the number of outputs of the signal S13 is set to a larger value in the frequency detection circuits 16 and 17 than in the frequency detection circuits 14 and 15. Also, to widen the noise admittance range, a criterion range per period determined by the criterion counts nfjh and nfjl is set wider in the frequency detection circuits 14 and 15 than in the frequency detection circuits 16 and 17. Consequently, even if the amount of jitter of a signal caused due to noise is relatively large, the frequency detection circuit 14, 15 identifies the signal as a signal with the predetermined frequency.

Figure 5:
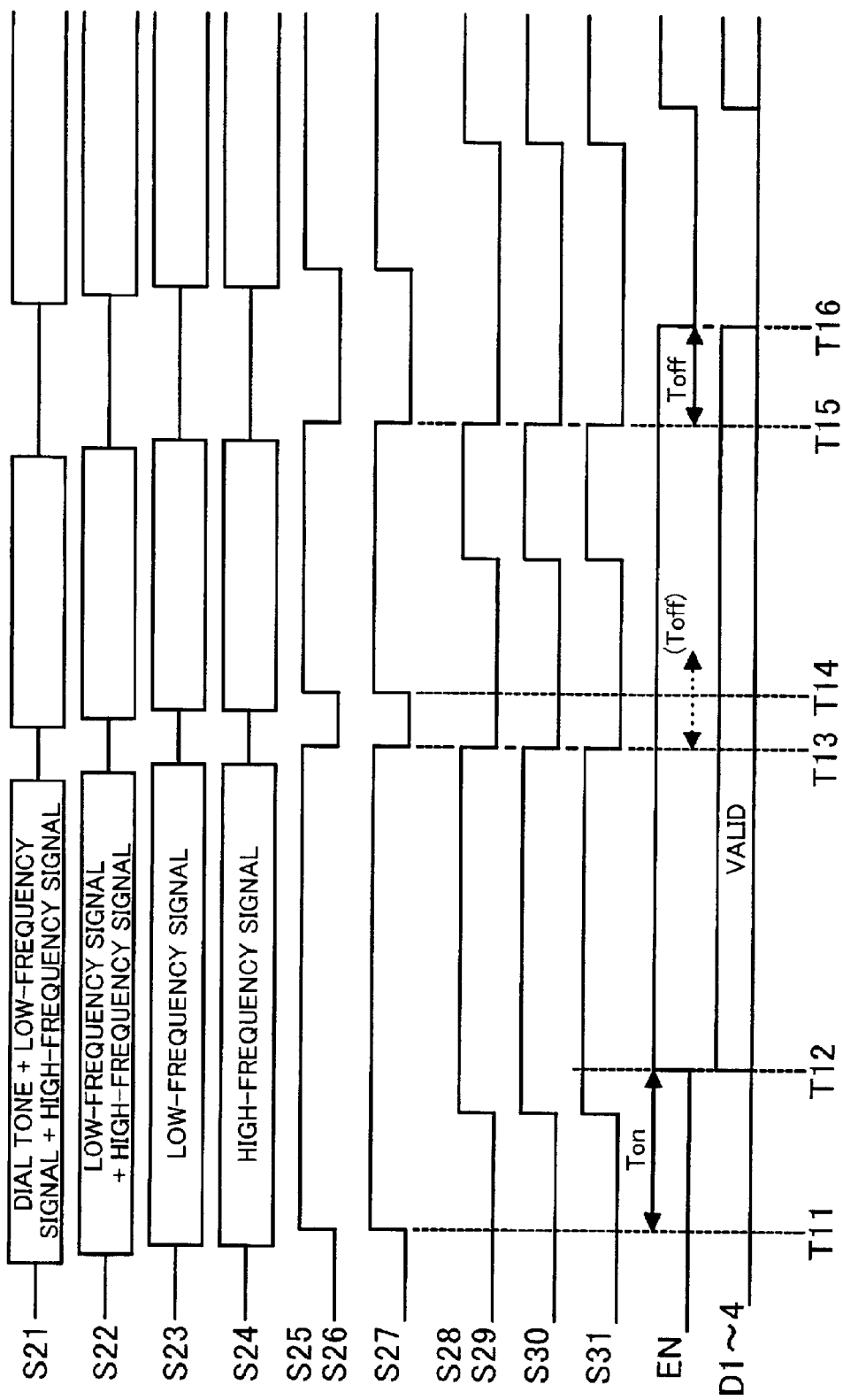
FIG. 5 is a chart showing signals appearing in various parts of the PB signal receiving circuit.
Figure 6:
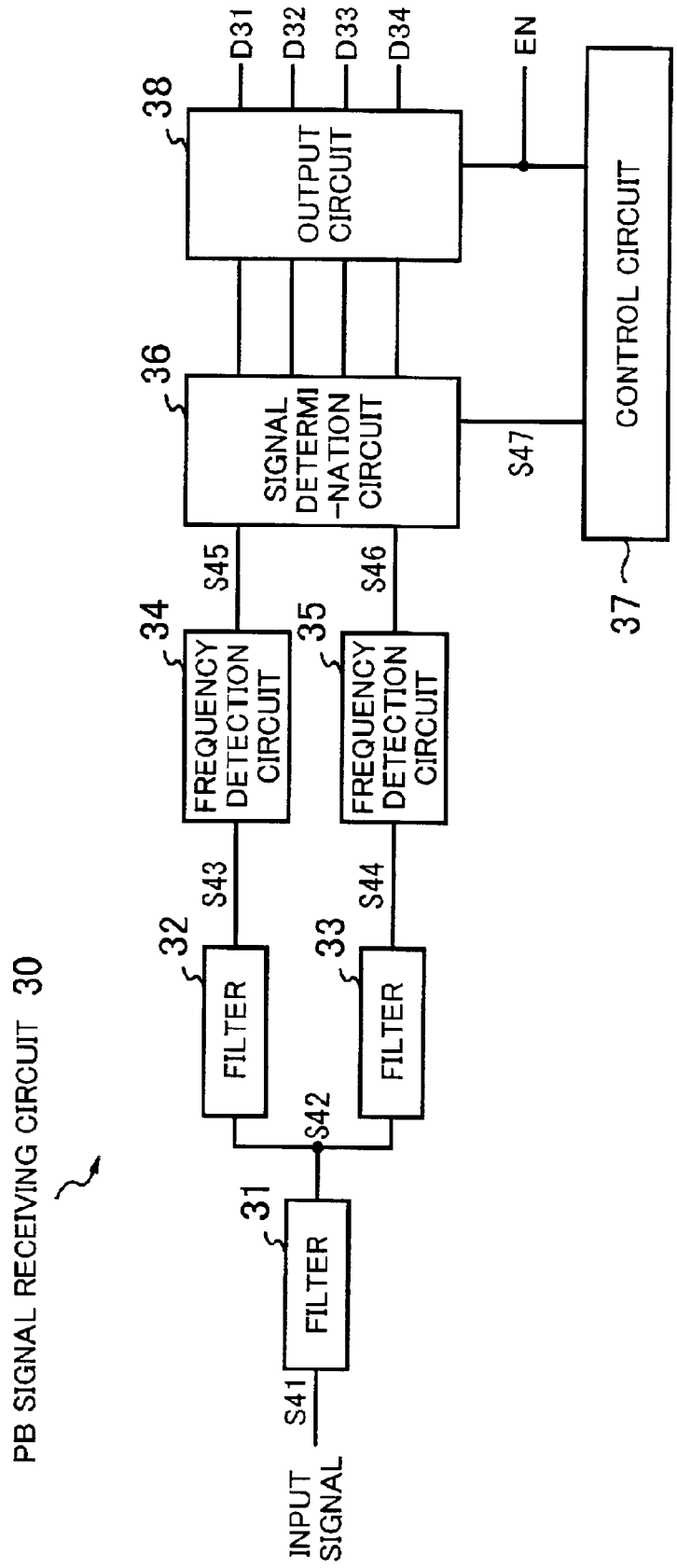
FIG. 6 is a diagram schematically showing an exemplary configuration of a conventional PB signal receiving circuit generally used.
Figure 7:
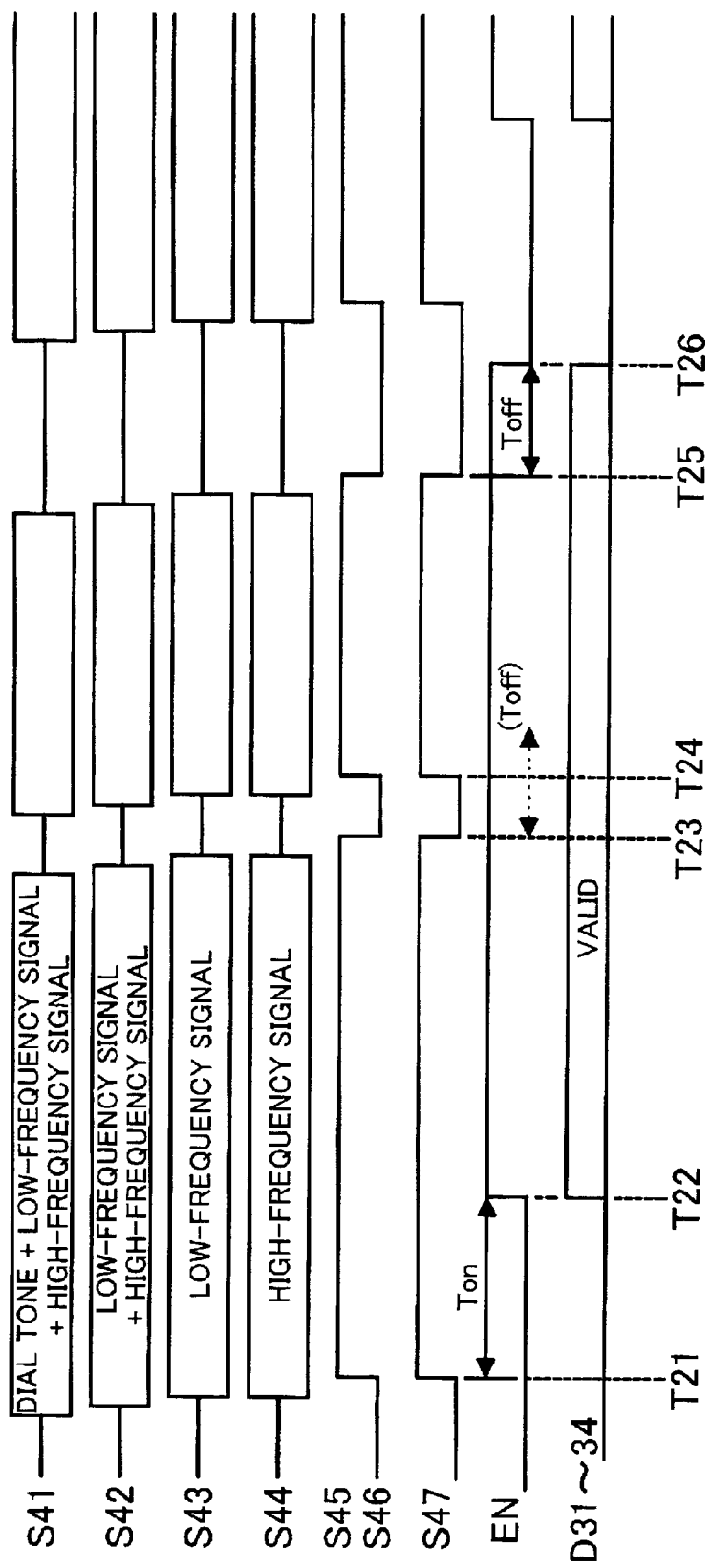
FIG. 7 is a timing chart showing time-based changes of signals appearing in various parts of the PB signal receiving circuit.
Figure 8:
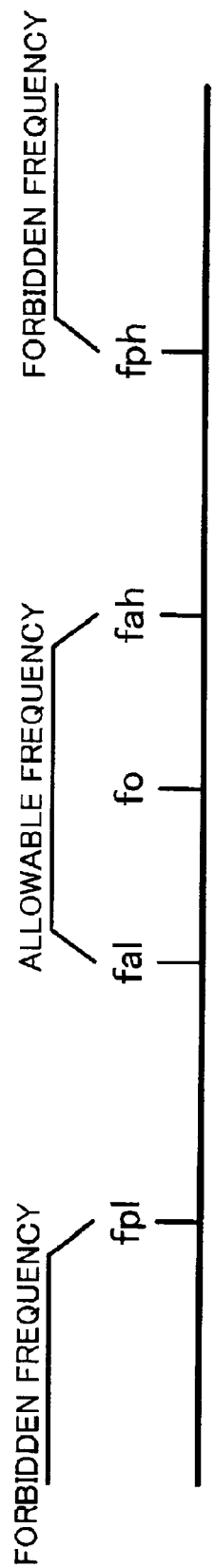
FIG. 8 is a chart showing frequency detection characteristics of the PB signal receiving circuit.
Figure 9:
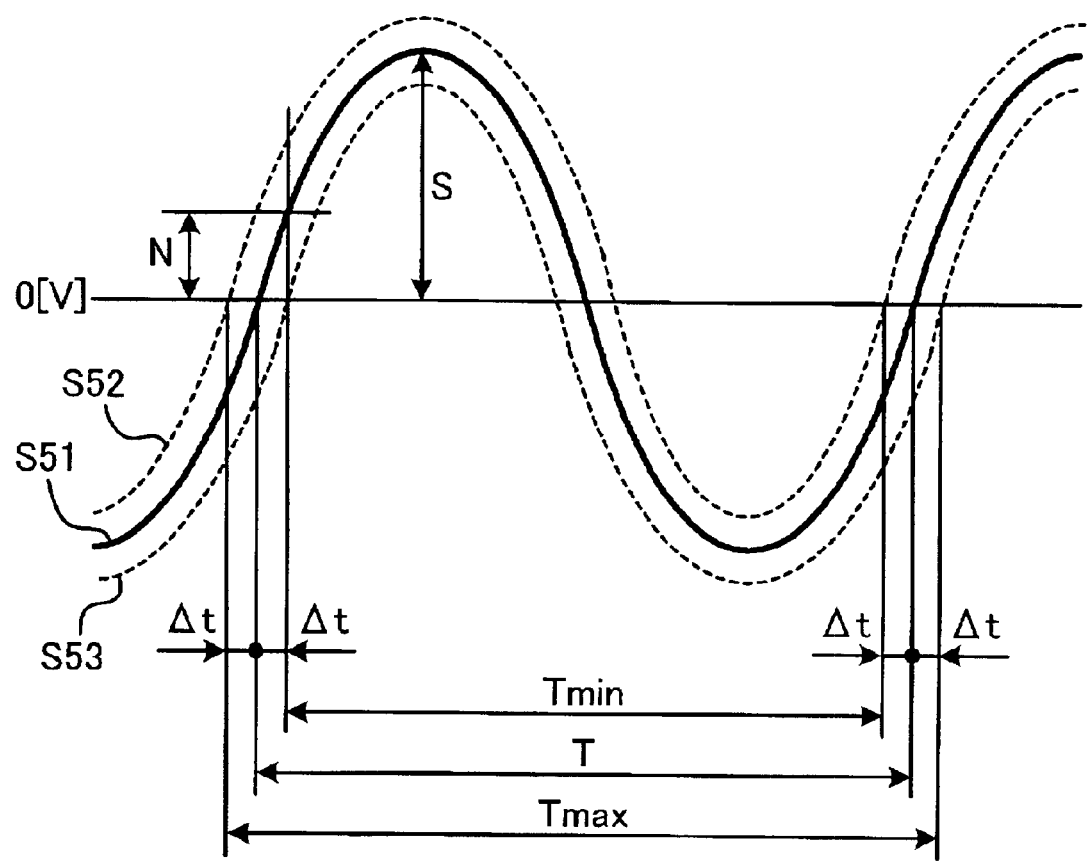
FIG. 9 is a chart illustrating variations in period caused by noise during period measurement.
Figure 10:
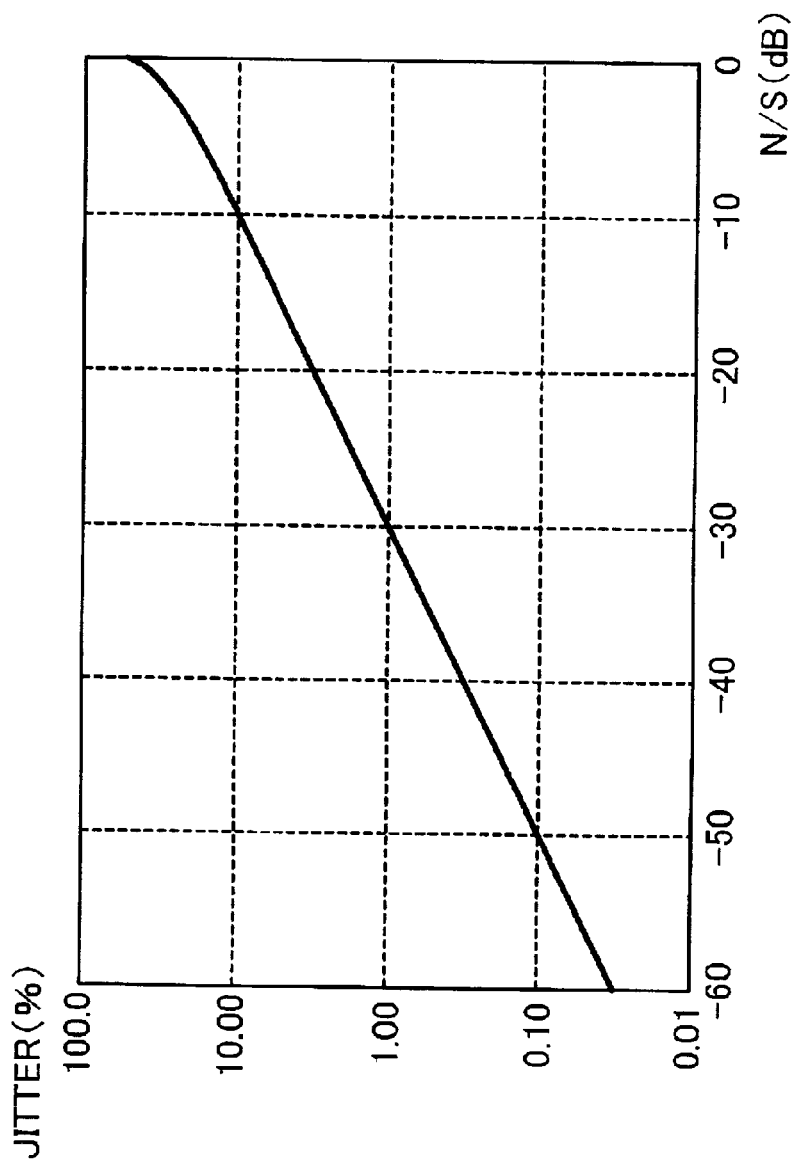
FIG. 10 is a graph showing the relationship between the amplitude ratio of noise to signal and jitter.
Figure 11:
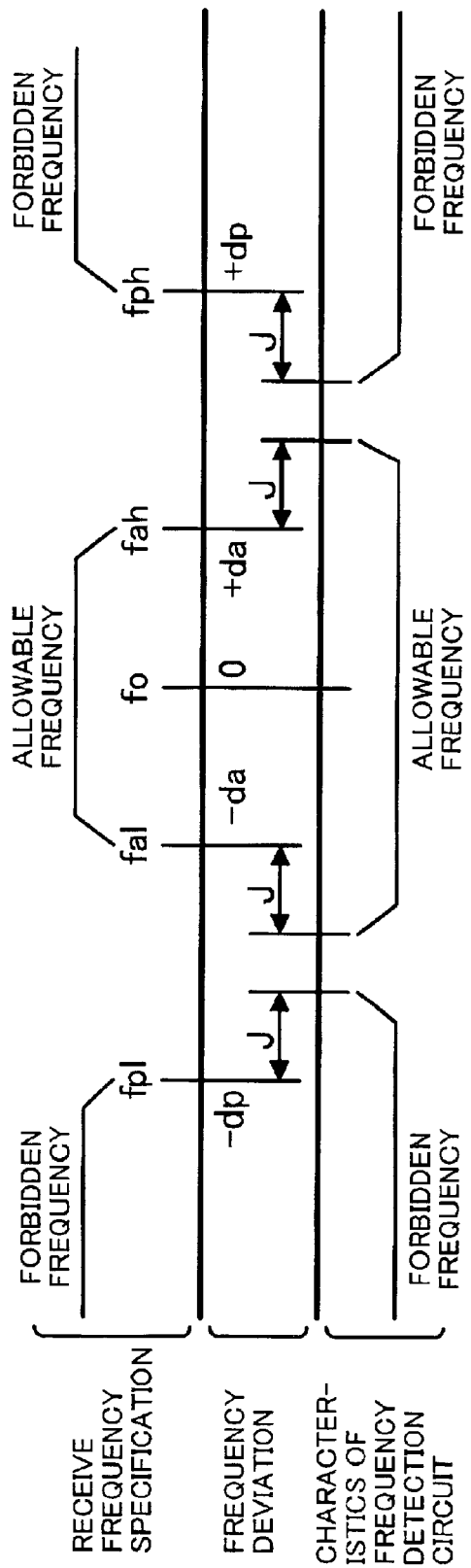
FIG. 11 is a chart illustrating influence of jitter on the frequency detection characteristics.
Figure 12:
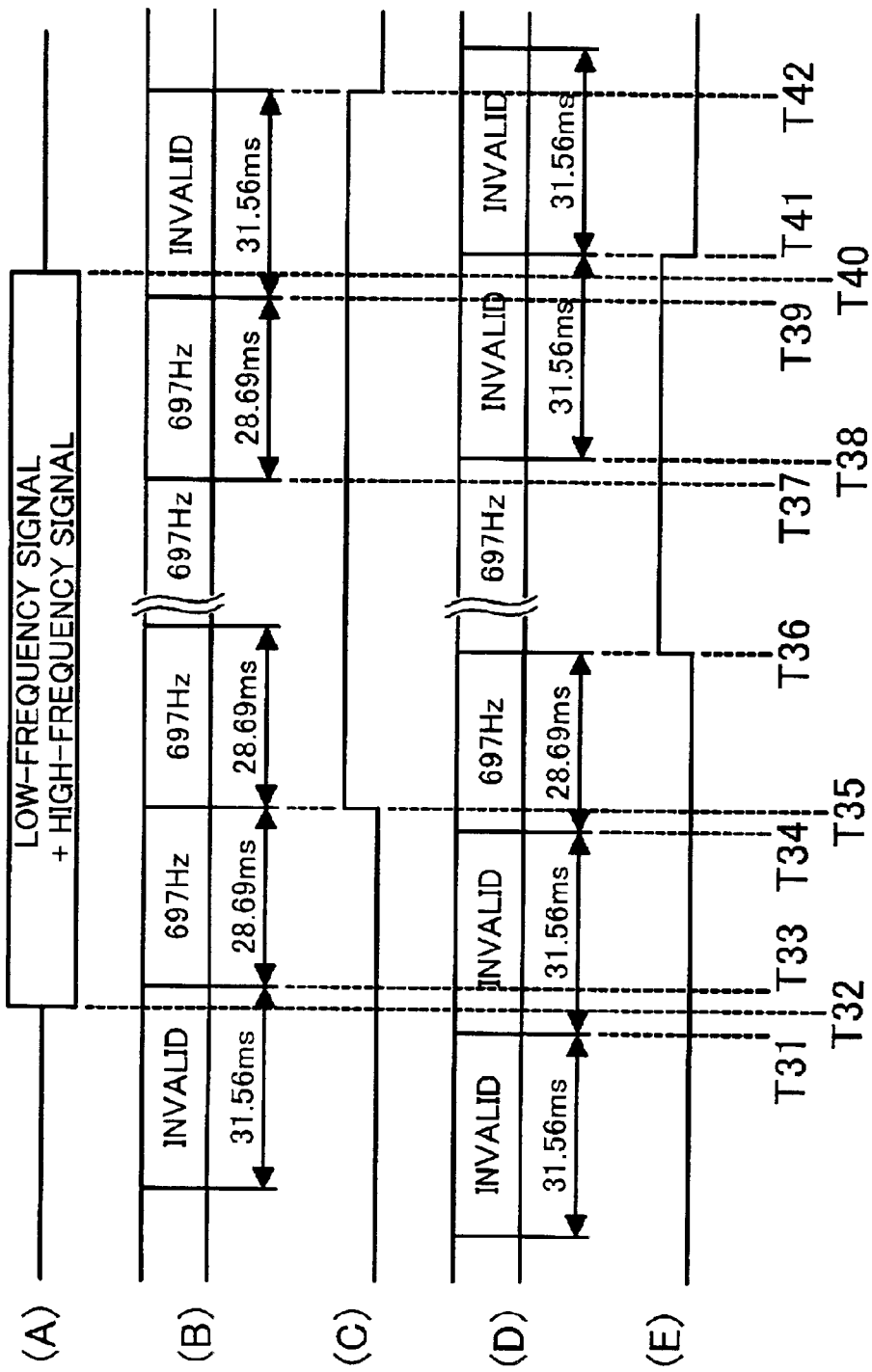
FIG. 12 is a chart showing examples of frequency detection over multiple periods of an input signal, wherein (A) shows the input signal, (B) shows the frequency determination according to a first example of detection, (C) shows the output of an identification signal according to the first example of detection, (D) shows the frequency determination according to a second example of detection, and (E) shows the output of the identification signal according to the second example of detection.
Figure 13:
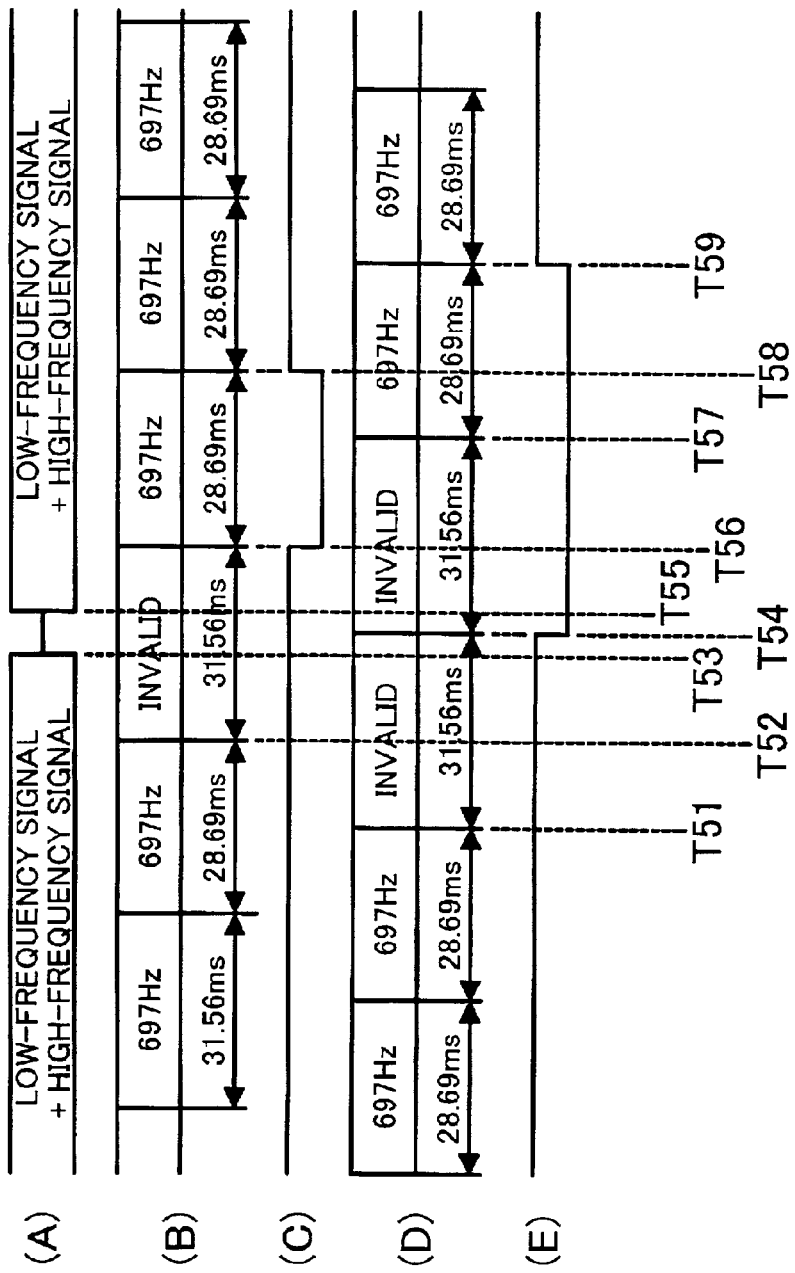
FIG. 13 is a chart showing examples of frequency detection over multiple periods of the input signal in the case where a short break occurs, wherein (A) shows the input signal, (B) shows the frequency determination according to a first example of detection, (C) shows the output of the identification signal according to the first example of detection, (D) shows the frequency determination according to a second example of detection, and (E) shows the output of the identification signal according to the second example of detection.

FIG. 5 shows signals appearing in various parts of the PB signal receiving circuit 10. Operation of the PB signal receiving circuit 10 will be now described with reference to FIGS. 2 and 5.

An input signal S21 including the dial-tone signal and low- and high-frequency signals is converted by the filter 11 to a signal S22 from which the dial-tone signal has been removed. The signal S22 is further converted by the filters 12 and 13 to signals S23 and S24 including only low and high frequencies, respectively.

The frequency detection circuits 14 and 15 perform period detection over a small number of periods of the input signals S23 and S24, respectively, and output signals S25 and S26 with low and high frequencies, respectively. The high level of the signal S25, for example, indicates that any one of the signals S14 Lo S17 is being output from a corresponding one of the comparator circuits 144a to 144d shown in FIG. 3. On detecting the input of both the signals S25 and S26 from the frequency detection circuits 14 and 15, the signal determination circuit 18 determines a dialed number based on the detected low and high frequencies, and outputs number data indicative of the result of determination to the coincidence detection circuit 20 and the output circuit 22 as 4-bit data D11, D12, D13 and D14. Also, the signal determination circuit 18 outputs a signal S27, which is a logical product of the input signals S25 and S26, to the frequency detection circuits 16 and 17 as well as the control circuit 21.

While the signal S27 from the signal determination circuit 18 is at the H level, the frequency detection circuits 16 and 17 perform period detection over numerous periods of the signals S23 and S24 input from the filters 12 and 13, respectively, and output signals S28 and S29 with low and high frequencies, respectively. On detecting the input of both the signals S28 and S29 from the frequency detection circuits 16 and 17, the signal determination circuit 19 determines a dialed number based on the detected low and high frequencies, and outputs number data indicative of the result of determination to the coincidence detection circuit 20 as 4-bit data D15, D16, D17 and D18. Also, the signal determination circuit 19 outputs a signal S30, which is a logical product of the signals S28 and S29, to the control circuit 21.

The coincidence detection circuit 20 determines whether or not the number data determined by the signal determination circuit 18 coincides with that determined by the signal determination circuit 19. To this end, the coincidence detection circuit 20 derives an exclusive OR of each of the data D11 to D14 from the signal determination circuit 18 and a corresponding one of the data D15 to D18 from the signal determination circuit 19, and outputs a coincidence detection signal S31, which is a NOT signal of the logical sum of all the exclusive OR's, to the control circuit 21.

The control circuit 21 monitors the signal S27 supplied from the signal determination circuit 18. Then, in accordance with the continuance time and discontinuance time of the signal S27 and the coincidence detection signal S31 from the coincidence detection circuit 20, the control circuit outputs a validity signal EN indicative of a valid period of the received PB signal to the output circuit 22.

The signal S27 from the signal determination circuit 18 is generated upon detection of the identification signals through the frequency detection over a small number of periods, and therefore, the rise and fall timings of the signal S27 indicates, with relatively high accuracy, the reception start and stop timings of the PB signal. Accordingly, by measuring the continuance time and discontinuance time of the signal S27, the control circuit determines whether the received PB signal is valid or not and also detects a minimum pause.

As shown in FIG. 5, on receiving the input signal S27 at timing T11, the control circuit 21 starts to measure the continuance time of the signal S27. The signal S31 is obtained through the frequency detection over numerous periods, and therefore, the input start timing thereof is later than that of the signal S27.

When the continuance time of the signal S27 reaches a preset continuance criterion time Ton at timing T12, the control circuit looks up the coincidence detection signal S31, and starts to output the validity signal EN if the coincidence detection signal is then at the H level. Thus, the coincidence detection signal S31 is looked up when the continuance criterion time Ton has elapsed, and this permits the validity signal EN to be output only when the dialed number identified based on the frequency detection by the frequency detection circuits 14 and 15 coincides with the dialed number identified based on the frequency detection by the frequency detection circuits 16 and 17.

As mentioned above, the frequency detection circuits 14 and 15 perform frequency detection over a smaller number of periods and have a wider noise admittance range, so that the frequency detection accuracy is relatively low, possibly causing erroneous recognition of the dialed number. On the other hand, the frequency detection circuits 16 and 17 carry out frequency detection over a larger number of periods and have a narrower noise admittance range, so that the frequency detection accuracy is high. Accordingly, the validity signal EN is output only when the coincidence detection signal S31 is being received, and only while the higher-accuracy frequency detection is performed, the received PB signal is judged valid, whereby erroneous operation attributable to error In the frequency detection over a small number of periods can be prevented.

When the input of the signal S27 discontinues at timing T13, the control circuit 21 starts to measure the discontinuance time. If the signal S27 is again input thereafter at timing T14 before the discontinuance time reaches a preset discontinuance criterion time Toff, the control circuit 21 judges that the discontinuance of the signal S27 from T13 to T14 is not a minimum pause, and thus holds the output of the validity signal EN as it is during the discontinuance time.

Subsequently, when the input of the signal S27 again discontinues at timing T15, the control circuit 21 again starts to measure the discontinuance time. At timing T16 after a lapse of the discontinuance criterion time Toff, the control circuit judges that this discontinuance is a minimum pause, and thus terminates the output of the validity signal EN.

When the output of the signal S27 from the signal determination circuit 18 discontinues, the frequency detection circuits 16 and 17 stop their frequency detection, and accordingly, the output of the signal S30 from the signal determination circuit 19 also discontinues at the same time.

The output circuit 22 derives a logical product of each of the data D11 to D14 from the signal determination circuit 18 and the validity signal EN from the control circuit 21, and outputs the results as data D1 to D4. Consequently, the dialed number then detected is output at accurate reception start and stop timings of the PB signal in response to the validity signal EN, whereby the dialed number can be accurately recognized.

As mentioned above, the PB signal receiving circuit 10 determines the validity of the input PB signal by using the signal S27 obtained through the frequency detection over a small number of periods, so that accurate reception timing of the PB signal can be detected. Also, at this time, it is determined whether or not the result of the frequency detection performed over a small number of periods coincides with the result of the frequency detection performed over a large number of periods, to enhance the frequency detection accuracy and thereby prevent error in the determination of dialed number.

Accordingly, even in cases where noise caused by ambient sound picked up the microphone of a telephone terminal, crosstalk of lines, etc. is superimposed and as a result the waveform of the received signal includes jitter, the influence of such jitter on the frequency detection can be lessened, thus improving the reception characteristics against noise. Also, since the forbidden frequency deviation can be reduced, it is possible to lower the rate of occurrence of erroneous operations such as erroneous recognition of a continuous signal included in speech or music during communication, for example, as the PB signal.

As described above, in the PS signal receiving circuit according to the present invention, the validity of the received PB signal is determined in accordance with the results of determination as to the coincidence of the continuance times of the identification signals extracted by the first and second frequency detecting portion for performing the frequency detection over a small number of periods, and the coincidence of the frequencies detected by the first and second frequency detecting portion with those detected by the third and fourth frequency detecting portion over a large number of periods. It is therefore possible to prevent erroneous operation attributable to either error in the frequency dejection of the identification signals or error in the recognition of the extraction start timing while allowing inclusion of a certain degree of noise.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention n the appended claims and their equivalents.

What is claimed is:

1. A push-button signal receiving circuit for receiving a push-button signal and identifying a dialed number based on the received push-button signal, comprising:

first and second frequency detecting portion provided respectively for low- and high-frequency identification signals included in the received push-button signal, for detecting frequencies of input signals over one or more periods thereof to extract the identification signals;

third and fourth frequency detecting portion provided respectively for the low- and high-frequency identification signals included in the received push-button signal, for detecting the frequencies of the input signals over a number of periods greater than that of said first and second frequency detecting portion, to extract the identification signals;

valid signal determining portion for determining whether the received push-button signal is valid or not based on results of determination as to coincidence of continuance times of the identification signals extracted by said first and second frequency detecting portion, coincidence of the frequencies detected by said first and third frequency detecting portion, and coincidence of the frequencies detected by said second and fourth frequency detecting portion; and dialed number output portion for outputting the dialed number based on the detected low and high frequencies if the push-button signal is judged valid by said valid signal determining portion, wherein said first, second, third and fourth frequency detecting portion each measure a time required until the number of times the signal level of the input identification signal crosses a threshold reaches a predetermined number, determine whether or not the measured time falls within an allowable time range, and detect the frequency of the identification signal, and wherein the allowable time range set in said first and second frequency detecting portion per period of the identification signal is wider than that set in said third and fourth frequency detecting portion.

2. The push-button signal receiving circuit according to claim 1, wherein said valid signal determining portion judges the received push-button signal to be valid if the identification signals extracted by said first and second frequency detecting portion continue for a fixed time and if the frequencies detected by said first and third frequency detecting portion coincide and if the frequencies detected by said second and fourth frequency detecting portion coincide.

3. The push-button signal receiving circuit according to claim 1, wherein said valid signal determining portion judges a valid length of the push-button signal to be terminated if the identification signals extracted by said first and second frequency detecting portion have discontinued for a fixed time.

4. The push-button signal receiving circuit according to claim 1, wherein said third and fourth frequency detecting portion start the frequency detection when the identification signals are extracted by said first and second frequency detecting portion.

5. The push-button signal receiving circuit according to claim 1, wherein said third and fourth frequency detecting portion terminate the frequency detection when the identification signals extracted by said first and second frequency detecting portion has discontinued.

6. A push-button signal detection method for receiving a push-button signal and identifying a dialed number based on the received push-button signal, comprising:

performing first and second frequency detection processes each with respect to low- and high-frequency identification signals included in the received push-button signal, said first frequency detection process being a process for detecting frequencies of input signals over one or more periods thereof to extract the identification signals, said second frequency detection process being a process for detecting the frequencies of the input signals over a number of periods greater than that of said first frequency detection process, to extract the identification signals;

judging that the received push-button signal is valid if the frequencies detected in said first and second frequency detection processes coincide with each other when the identification signals extracted in said first frequency detection process have continued for a fixed time; and outputting the dialed number based on the detected low and high frequencies if the received push-button signal is judged valid, wherein said first, second, third and fourth frequency detecting portion each measure a time required until the number of times the signal level of the input identification signal crosses a threshold reaches a predetermined number, determine whether or not the measured time falls within an allowable time range, and detect the frequency of the identification signal, and wherein the allowable time range set in said first and second frequency detecting portion per period of the identification signal is wider than that set in said third and fourth frequency detecting portion.

* * * * *